United States Patent

[11] 3,610,580

| [72] | Inventor | George Bernard Johnstone<br>Liverpool, England |
|---|---|---|
| [21] | Appl. No. | 844,811 |
| [22] | Filed | July 25, 1969 |
| [45] | Patented | Oct. 5, 1971 |
| [73] | Assignee | Joloda Transport Equipment Limited<br>Liverpool, Lancashire, England |
| [32] | Priority | Aug. 9, 1968 |
| [33] | | Great Britain |
| [31] | | 38151/68 |

[54] TROLLEY
2 Claims, 7 Drawing Figs.

[52] U.S. Cl....................................................... 254/5 C,
104/35, 214/38 CC
[51] Int. Cl....................................................... B60p 1/44,
B65g 67/00
[50] Field of Search............................................. 254/5.6,
5.4, 5.2, 2.2, 2.4, 2.6; 280/46, 43.12; 104/135;
214/38 CC

[56] References Cited
UNITED STATES PATENTS
1,286,861  12/1918  Willer........................... 254/5.6

| 3,074,691 | 1/1963 | Knapp et al................. | 254/5.6 |
| 3,091,477 | 5/1963 | Johnstone.................... | 254/5.6 |

FOREIGN PATENTS

| 867,265 | 5/1961 | Great Britain................ | 254/5.6 |

OTHER REFERENCES

German Printed Application No. 1,089,143, 9- 1960,
Trepel, 254/5.6

*Primary Examiner*—Robert C. Riordon
*Assistant Examiner*—Roscoe V. Parker, Jr.
*Attorney*—Berman, Davidson and Berman ABSTRACT: The invention is for a trolley comprising a carriage and a load-carrying member mounted on said carriage so that relative movement can take place between the carriage and the load-carrying member in the direction of travel of the trolley, said relative movement being effected by a manually operable hydraulic ram. An inclined plane is provided on the load-carrying member and a roller-follower on the carriage, or vice versa. This inclined plane and roller-follower cooperate when said relative movement between the carriage and the load-carrying member takes place to raise the load-carrying member relatively to the carriage.

PATENTED OCT 5 1971
3,610,580
SHEET 1 OF 2
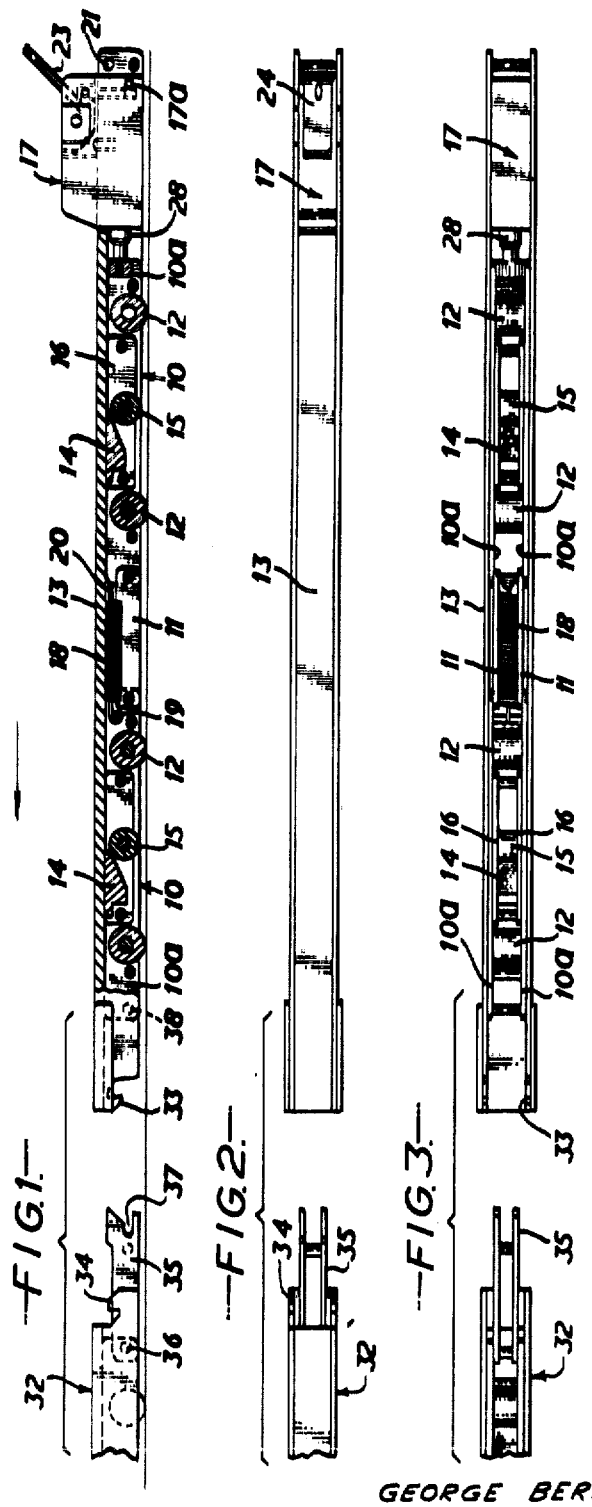
INVENTOR:
GEORGE BERNARD JOHNSTONE,
BY
ATTORNEYS.

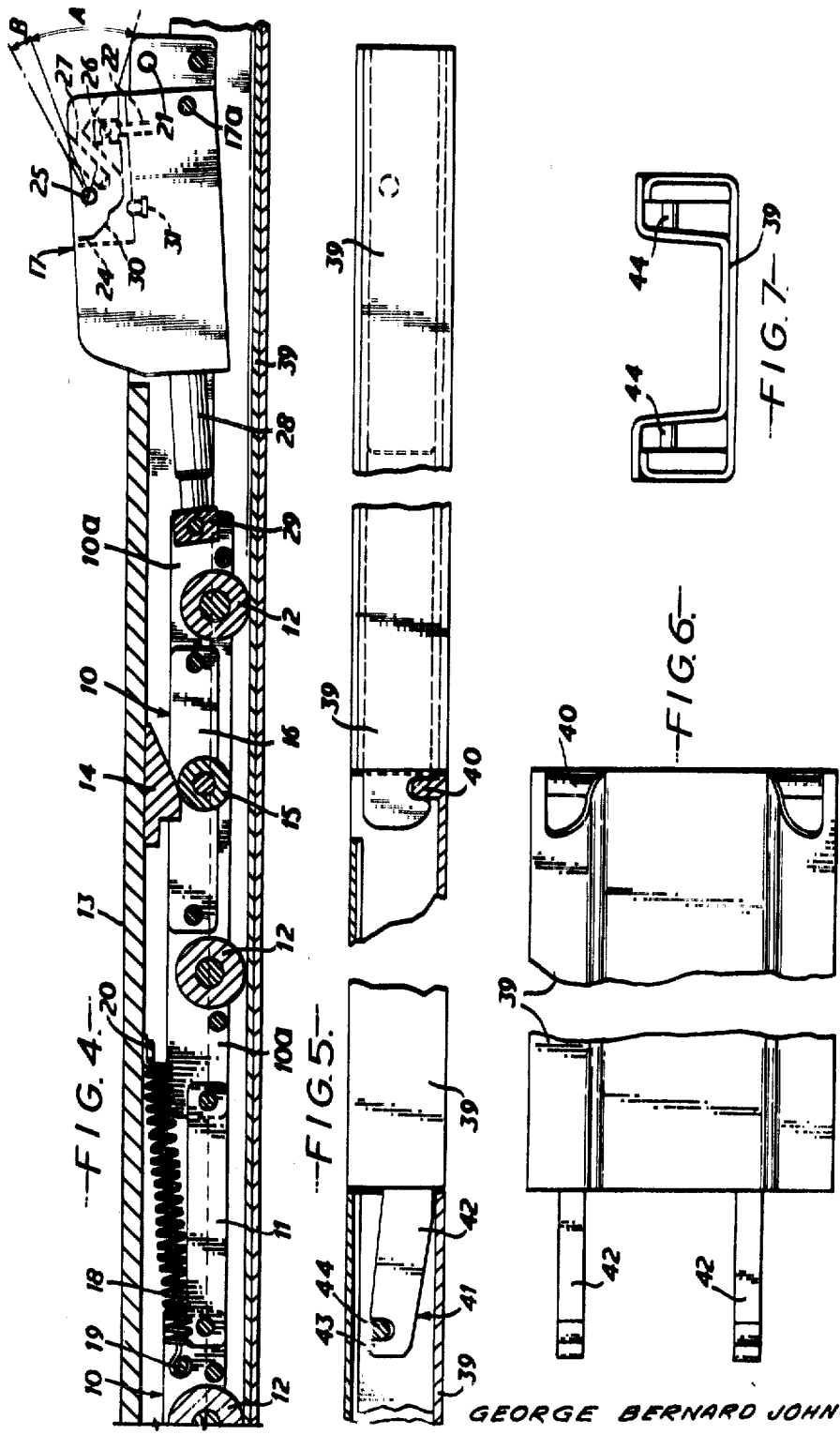

TROLLEY

This invention is for improvements in or relating to trolleys for facilitating the handling and movement of articles and particularly heavy articles.

According to the present invention there is provided a trolley comprising a bogie or carriage, a load-carrying member mounted on said bogie or carriage, said bogie or carriage and load-carrying member being relatively movable, an inclined plane or cam face on the load-carrying member and a follower on the bogie or carriage, or vice versa, which cooperate, when said relative movement between the bogie or carriage and load-carrying member takes place, to raise the load-carrying member relatively to the bogie or carriage, and a pressure fluid ram or piston and cylinder device for effecting said relative movement between the bogie or carriage and the load-carrying member.

In a preferred embodiment of the invention the relative movement between the load-carrying member and the bogie or carriage is in the direction of travel of the trolley.

With an arrangement as above set forth the trolley can be run under a load supported clear of the floor or ground. The load-carrying member can then be raised so as to lift the load clear of its supports following which the load can be transported to another place and lowered onto supports thereat by allowing reverse relative movement between the bogie or carriage and the load-carrying member to take place so that the latter is lowered.

In one preferred embodiment of the invention the follower is a roller which engages an inclined plane provided on the underside of the load-carrying member. There may be two or more such roller and inclined plane devices along the length of the trolley.

One particular embodiment of the invention will now be described, by way of example, with reference to the accompanying drawings in which:

FIG. 1 is a side elevation of the trolley partly in section and showing how the trolley may be extended by the attachment to it in tandem of an extension unit, FIG. 2 is a plan view of FIG. 1, FIG. 3 is an inverted plan view of FIG. 1, FIG. 4 is a fragmentary sectional elevation showing in greater detail the operating mechanism for the trolley, the load-carrying member being shown in its elevated position, FIG. 5 is a side view partly in section of a length of track in which the trolley may run, FIG. 6 is a fragmentary plan view of a portion of the track shown in FIG. 5, and FIG. 7 is an end view of the track shown in FIG. 5.

The trolley shown on the drawings comprises two bogies or carriages 10 coupled together by a link 11. Each bogie includes spaced-apart sideplates 10a and wheels or rollers 12 supported between said sideplates.

A load-carrying member 13 of inverted channel section is positioned over the bogies 10. Inclined plane devices 14 are secured on the underside of the web of the load-carrying member 13 and rest on roller-followers 15 rotatably supported between cheek plates 16 secured to the sideplates 10a of the bogies.

The construction above described is such that the bogies or carriages 10 can reciprocate relatively to the load-carrying member 13 in the direction of length of the trolley, movement in the direction of the arrow in FIG. 1 being effected by a hydraulic unit 17 against the action of a tension spring 18 connected at 19 to one of the bogies and at 20 to the underside of the load-carrying member 13.

The hydraulic unit 17 comprises a pump having a piston 22 adapted to be reciprocated by means of a handle 23 through a lever 24 pivotally mounted in the hydraulic unit at 25. The lever 24 is pivotally connected to the piston 22 at 26 and has a socket 27 (see FIG. 4) to receive the handle 23. The hydraulic pump having the piston 22 supplies hydraulic fluid under pressure to a ram 28 coupled at 29 to the neighboring bogie 10.

The lever 24 has a forward part 30 adapted, as hereinafter described, to operate a plunger valve 31 for releasing pressure fluid from the ram 28.

The hydraulic unit 17 includes a reservoir for hydraulic fluid so that in effect it constitutes a complete closed circuit hydraulic pump and ram unit. The hydraulic unit 17 is pivotally supported, at 17a, by and compactly between the side flanges of the load-carrying member 13.

Assuming it is required to transport a load from one place to another the trolley is run under the load which it may be assumed is supported clear of the ground or floor on a pallet having lengths or blocks of timber or other supports on its underside. The handle 23 is then reciprocated over the arc A (FIG. 4) and hydraulic fluid is pumped into the ram 28. The latter is thus extended so as to move the bogies or carriages 10 to the left relatively to the load-carrying member 13. As a result the rollers 15 engaging the inclined plane devices or ramps 14 cause the load-carrying member 13 to be raised. Thus, the loaded pallet is raised clear of the ground or floor and can be transported to a new location and lowered thereat by moving the hand lever 23, or allowing it to move, to the position indicated at B in FIG. 4. B causes operation of the valve 31 and release of the pressure fluid from the ram 28 so that the bogies or carriages 10 are moved to the right, relatively to the load-carrying member 13, by the action of the gravity load on the ramps 14.

The normal position for the handle 23 may be that indicated at B in FIG. 4 so that immediately the handle is released the loaded pallet will be lowered automatically onto the ground or floor and there is no risk of the trolley running away out of control.

A hole 21 is provided at one end of the trolley for the attachment thereto of a pulling hook, rope or the like.

To extend the trolley in length an extension unit 32 may be provided as shown in FIGS. 1, 2 and 3.

Conveniently this extension unit is automatically coupled to the trolley when the two are presented one to the other. For this purpose the trolley is provided with a hooklike member 33 at one end which is adapted to interlock with a hooklike member 34 on the neighboring end of the extension unit 32. The coupling arrangement also includes a link 35 pivoted at 36 to the trolley extension 32 and having a forked end 37 adapted to locate on a pin 38 on the trolley.

The other end of the extension unit may be provided with a hooklike member, similar to the member 33 so that a further extension unit may be similarly coupled to it. The trolley may have any number of extension units coupled to it by this or some other coupling arrangement.

The trolley (with or without extension units) may be arranged to run in a channel section track or rail laid or located, for example, on the ground or on or in the floor of a vehicle or transport container body where the trolley is to be used for loading and unloading such a vehicle or container. A convenient form of rail is shown in FIGS. 5, 6 and 7. The track or rail may be in any number of sections 39 adapted to be hooked together as indicated at 40 in FIG. 5 or alternatively by the means indicated at 41 in FIG. 5. In the arrangement shown at 41 an end of one section of track is provided with upwardly cranked arms 42 adapted to enter the end of the neighboring section of track and having hooked portions 43 which engage pins 44 in said next section of track. The arrangement is such that when two sections of track are in horizontal alignment the hooked parts 43 engage the pins 44. To disconnect the sections of track all that is necessary is to angle one section of track upwardly so as to disengage its hooked members 42, 43 from the pins 44 of the other section.

Two or more of the trolleys above described, with or without extension units 32, may be arranged to run in a side-by-side parallel arrangement. For instance, they may be connected together or they may be arranged to run in parallel tracks set, for example, in or on the floor of a vehicle, transport container or building. The track may, of course, be readily portable and for that reason may be made up in sections adapted to be connected together end to end as previously described.

A set (i.e., trolley and track) or sets of the above equipment provided at transport terminals greatly facilitates the loading and unloading of vehicles and containers at such terminals, the track and trolley being temporarily installed in or on the floor of the vehicle or container as and where required.

By locating the track in channels, grooves or the like in the floor of a vehicle or container the trolley can be run under the supports on the underside of a pallet where said supports are positioned so as to bridge said channels or grooves.

I claim:

1. In combination, a trolley comprising a plurality of carriages linked together in tandem, a load-carrying member mounted on said carriages, said carriages and said load-carrying member being relatively movable in the direction of travel of the trolley, a pressure fluid ram device operative to effect said relative movement between the carriages and the load-carrying member, an inclined plane means and a follower means movable on and along said inclined plane means, one of said means being on the carriages and the other on the load-carrying member, said inclined plane means and said follower means cooperating, when said relative movement between the carriages and the load-carrying member takes place, to raise the load-carrying member relatively to the carriages, at least one trolley extension which also comprises a plurality of carriages linked together in tandem, a load-carrying member mounted on said carriages, said carriages and said load-carrying member being relatively movable in the direction of travel of the trolley, an inclined plane means and follower means movable on and along said inclined plane means, one of said means being on the carriages of the trolley extension and the other on the load-carrying member of the trolley extension, said last-mentioned inclined plane means and said last-mentioned follower means cooperating, when said relative movement between the carriages and the load-carrying member of the trolley extension takes place, to raise the load-carrying member of the trolley extension relatively to the carriages thereon, coupling means on an end carriage of the trolley releasably engaging coupling means on a neighboring end carriage of the trolley extension, coupling means on the load carrying member of the trolley releasably engaging coupling means on the neighboring end of the load-carrying member of the trolley extension, all of said coupling means coupling the trolley extension to the trolley and transmitting said relative movement between the carriages and the load-carrying member of the trolley to the carriages and load-carrying member of the trolley extension whereby said load-carrying member of the trolley extension is raised simultaneously with the load-carrying member of the trolley, and rail for said trolley and trolley extension said rail comprising at least two rail sections and means for releasably connecting one section of said rail to the other section in end-to-end alignment.

2. The combination claimed in claim 1 wherein neighboring ends of the rail sections have respectively a hook member and a part to be engaged by said hook member to secure the sections together, the hook member on the one section being cranked so that by angularly raising and lowering one section of track relatively to the other section said hook member can be engaged or disengaged from said part on the other section.